US010135532B2

(12) United States Patent
Ponzini et al.

(10) Patent No.: US 10,135,532 B2
(45) Date of Patent: Nov. 20, 2018

(54) OPTICAL RECEIVER AND METHOD OF RECEIVING AN OPTICAL COMMUNICATIONS SIGNAL

(71) Applicant: Telefonaktiebolaget LM Ericsson (publ), Stockholm (SE)

(72) Inventors: Filippo Ponzini, Pisa (IT); Boris Dortschy, Stockholm (SE); Luca Giorgi, Pisa (IT); Patryk Urban, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 15/570,181

(22) PCT Filed: Apr. 30, 2015

(86) PCT No.: PCT/EP2015/059574
§ 371 (c)(1),
(2) Date: Oct. 27, 2017

(87) PCT Pub. No.: WO2016/173672
PCT Pub. Date: Nov. 3, 2016

(65) Prior Publication Data
US 2018/0123694 A1    May 3, 2018

(51) Int. Cl.
*H04J 14/02* (2006.01)
*H04B 10/2575* (2013.01)
*H04B 10/60* (2013.01)

(52) U.S. Cl.
CPC . *H04B 10/25753* (2013.01); *H04B 10/25758* (2013.01); *H04B 10/60* (2013.01); *H04J 14/0298* (2013.01); *H05K 999/99* (2013.01)

(58) Field of Classification Search
CPC ........ H04B 10/25753; H04B 10/25758; H04B 10/60; H04J 14/0298; H05K 999/99
(Continued)

(56) References Cited

U.S. PATENT DOCUMENTS 6,115,162 A      9/2000  Graves et al.
2005/0271387 A1*  12/2005  Kee ................... H04B 10/2543
                                                                   398/140
(Continued)

FOREIGN PATENT DOCUMENTS

WO    2014137256 A1    9/2014
WO    2015154806 A1    10/2015

OTHER PUBLICATIONS

Cox III, Charles H. et al., "Limits on the Performance of RF-Over-Fiber Links and Their Impact on Device Design", IEEE Transactions on Microwave Theory and Techniques, vol. 54, No. 2, Feb. 2006, 906-920.
(Continued)

Primary Examiner — Dalzid Singh
(74) Attorney, Agent, or Firm — Murphy, Bilak & Homiller, PLLC

(57) ABSTRACT

An optical receiver (10) comprising: an input (12) arranged to receive a subcarrier multiplexing, SCM, optical signal (14) comprising an optical carrier and an optical subcarrier, each having a respective optical power; a carrier suppression element, CSE, (16) arranged to receive the SCM optical signal and having a rejection band that is tunable in frequency to partially suppress the optical carrier by a variable amount; an optical amplifier (18) having a variable gain and arranged to receive the SCM optical signal from the CSE and amplify the optical carrier and the optical subcarrier; a photoreceiver (20) arranged to receive the SCM optical signal from the amplifier; and a controller (24) arranged to cause frequency tuning of the rejection band and variation of the gain of the optical amplifier to adjust a ratio of the optical power of the optical carrier at the photoreceiver to the optical power of the optical subcarrier at the photoreceiver (Continued)

based on an indication of performance of the SCM optical signal.

17 Claims, 8 Drawing Sheets

(58) Field of Classification Search
USPC .......................................................... 398/68
See application file for complete search history.

(56) References Cited

U.S. PATENT DOCUMENTS

| | | |
|---|---|---|
| 2007/0053688 A1 | 3/2007 | Benz et al. |
| 2009/0169213 A1* | 7/2009 | Lowery .............. H04B 10/2513 398/98 |
| 2011/0013914 A1* | 1/2011 | Lowery .................. H04B 10/60 398/158 |
| 2014/0099115 A1* | 4/2014 | Tanaka .................. H04J 14/028 398/76 |
| 2015/0071641 A1* | 3/2015 | Wen .................... H04B 10/5165 398/98 |

OTHER PUBLICATIONS

Lim, Christina et al., "Investigation of Intermodulation Distortion Reduction Technique for Multi-Channel Fiber-Radio Transmission in Heterogeneous Access Networks", 19th Annual Meeting of the IEEE Lasers and Electro-Optics Society (LEOS 2006), Oct. 29-Nov. 2, 2006, 264-265.

Xu, Chen et al., "Performance Improvement in RoF Links Based on Optical Carrier Suppression using a Phase-Shifted FBG", Asia Communications and Photonics Conference (OSA 2013), Nov. 2013, 1-3.

* cited by examiner

OPTICAL RECEIVER AND METHOD OF RECEIVING AN OPTICAL COMMUNICATIONS SIGNAL

TECHNICAL FIELD

The invention relates to an optical receiver, and to an optical transceiver comprising the optical receiver and a communications network node comprising the optical receiver. The invention further relates to a method of receiving an optical communications signal.

BACKGROUND

Radio over fibre, RoF, in combination with Sub-Carrier Multiplexing, SCM, technology is a promising solution to feed several radio antennas on a common optical fibre due to the large available bandwidth. A number of radio signals are combined together and used to modulate an optical carrier to be transmitted over optical fibre. SCM can be used to combine many radio signals on a single wavelength, and wavelength division multiplexing, WDM, enables many wavelength channels to be multiplexed into a single optical fibre. The combination of WDM and SCM provides an efficient, potentially high-performing solution for mobile fronthaul, in particular when there is a high-density of radio antenna heads/cells.

As reported in C. Xu et al, "Performance improvement in RoF linked based on optical carrier suppression using a phase-shifted FBG", Proceedings of the Asia Communications and Photonics Conference 2013, ATh3G.3, suppressed carrier SCM transmission provides an increased optical power budget and better optical link performance. In addition, the application of photonic integration can enable cost-effective implementation of arrays of transceivers with active elements (such as semi-conductor optical amplifiers and WDM optical sources).

In RoF, the overall system performance is limited by optical subsystem blocks, mainly due to the nonlinear transfer function of the electro-optical modulator in each transceiver. It is essential to provide high spurious free dynamic range, SFDR. Actual systems, except for those which are too expensive to be deployed for this kind of application, have poor performance in term of SFDR. Conventional SCM techniques leave most of the optical power in the optical carrier baseband, limiting SFDR and optical power budget. To improve the power per subcarrier, and thus provide higher SFDR, one can reduce the optical carrier and afterwards optically amplify the signal, as reported by C. Xu et al, supra. The effectiveness of the carrier suppression technique requires a precise power calibration of the ratio between carrier and subcarriers and then a proper adjustment of the optical amplifier gain.

Current mobile fronthaul networks are not reconfigurable in the optical domain. This is a major limitation for network operators since they are not able to allocate dynamically network resources, such as wavelengths or subcarriers, according to their needs. Moreover the installation process requires skilled technicians and huge inventory costs typical of WDM systems. Analog systems have many advantages in terms of latency control and easier centralization of processing resources, but they are typically not robust to noise and distortions; for example, intermodulation products due to non linearities. SCM based on partial carrier suppression offers an improvement in terms of robustness to distortions and noise, but it is difficult to choose the optimal power ratio between optical carrier and SCM subcarriers because it changes from system to system and over time.

SUMMARY

It is an object to provide an improved optical receiver. It is a further object to provide an improved optical transceiver. It is a further object to provide an improved communications network node. It is a further object to provide an improved method of receiving an optical communications signal.

A first aspect of the invention provides an optical receiver comprising an input, a carrier suppression element, an optical amplifier, a photoreceiver and a controller. The input is arranged to receive a subcarrier multiplexing, SCM, optical signal. The SCM optical signal comprises an optical carrier and an optical subcarrier, each having a respective optical power. The carrier suppression element is arranged to receive the SCM optical signal and has a rejection band that is tunable in frequency to partially suppress the optical carrier by a variable amount. The optical amplifier has a variable gain and is arranged to receive the SCM optical signal output from the carrier suppression element and is arranged to amplify the optical carrier and the optical subcarrier. The photoreceiver is arranged to receive the SCM optical signal output from the optical amplifier. The controller is arranged to cause frequency tuning of the rejection band of the carrier suppression element and variation of the gain of the optical amplifier so as to adjust a ratio of the optical power of the optical carrier at the photoreceiver to the optical power of the optical subcarrier at the photoreceiver based on an indication of performance of the SCM optical signal.

The optical receiver may improve the link performance for RoF transmission by using SCM by optimizing carrier suppression at the receiver side of the link. By adjusting the optical carrier to subcarrier optical power ratio based on the indication of performance of the SCM optical signal the ratio may be optimized. The optical receiver may control the carrier to subcarrier amplitude ratio by controlling an amount of suppression applied to a received optical carrier and by controlling an amount of gain applied to the SCM optical signal following carrier suppression. The optical receiver operates at the physical layer and does not require any inband or outband communication between the optical receiver and a transmitter generating the SCM optical signal that is being received. Operation at the physical layer also means that the optical receiver is able to operate with low latency. The optical receiver is fully transparent with respect to the bandwidth and modulation format of the SCM optical signal. The optical receiver may provide an improvement in optical link performance in terms of link power budget and SFDR compared with known SCM techniques.

In an embodiment, the controller is arranged to monitor a performance indicator of the SCM optical signal. The controller is arranged to cause frequency tuning of the rejection band of the carrier suppression element and variation of the gain of the optical amplifier so as to adjust the ratio of the optical power of the optical carrier at the photoreceiver to the optical power of the optical subcarrier at the photoreceiver based on the performance indicator. This may enable the optical receiver to find the optimal optical carrier suppression ratio for a chosen performance indicator, and tune the frequency of the rejection band and the amplifier gain accordingly.

In an embodiment, the input is arranged to receive the SCM optical signal from an optical link. The performance indicator is a link performance indicator of the optical link.

The optical receiver may therefore determine an appropriate set of parameters (frequency of the rejection band and the amplifier gain) in order to optimize the performance of the optical link. The optical receiver may enable a precise calibration of the optical carrier power by monitoring an appropriate link performance indicator. The optical receiver may enable the optimal value of the carrier-subcarrier ratio to be determined which maximizes the chosen link performance indicator, LPI.

In an embodiment, the link performance indicator comprises at least one link parameter, such as end to end error-vector magnitude, EVM, link gain and spurious free dynamic range, SFDR. The optical receiver may enable a precise calibration of the optical carrier power by monitoring an appropriate link performance indicator, that may include one or more link parameters. The optical receiver may enable the optimal value of the carrier-subcarrier ratio to be determined which maximizes the chosen link performance indicator, LPI.

In an embodiment, the link performance indicator comprises one of achievable effective power of the optical subcarriers, effective modulation index of the SCM optical signal after carrier suppression, EVM, SFDR, gain of the optical link, and a noise figure of the optical link. The optical receiver may enable a precise calibration of the optical carrier power by monitoring an appropriate link performance indicator, that may include one or more link parameters. The optical receiver may enable the optimal value of the carrier-subcarrier ratio to be determined which maximizes the chosen link performance indicator, LPI.

This may enable the optical receiver to find the optimal optical carrier suppression ratio for a chosen performance indicator, and tune the frequency of the rejection band and the amplifier gain accordingly.

In an embodiment, the controller is arranged to perform steps a. to l., as follows:

a. obtain a current central frequency of the rejection band of the carrier suppression element, a current value of the performance indicator and a current gain of the optical amplifier;

b. receive an initial value of the optical power of the SCM optical signal received at the photoreceiver;

c. cause frequency tuning of the rejection band, increasing the current central frequency by a frequency increment, $\Delta f$;

d. receive a current value of the optical power of the SCM optical signal received at the photoreceiver;

e. cause the gain of the optical amplifier to change by an amount to restore the optical power of the SCM optical signal received at the photoreceiver to said initial value of the optical power;

f. obtain a current value of the performance indicator and compare the current value to the previous value of the performance indicator, and:

i. if the current value is greater than the previous value, return to step c.;

ii. if the current value is less than or equal to the previous value, continue to step g.

g. cause frequency tuning of the rejection band, decreasing the current central frequency by twice the frequency increment, $2\Delta f$;

h. receive a current value of the optical power of the SCM optical signal received at the photoreceiver;

i. cause the gain of the optical amplifier to change by an amount to restore the optical power of the SCM optical signal received at the photoreceiver to said initial value of the optical power;

j. obtain a current value of the performance indicator and compare the current value to the previous value of the performance indicator, and:

i. if the current value is greater than the previous value, continue to step k.;

ii. if the current value is less than or equal to the previous value, continue to step l.

k. cause frequency tuning of the rejection band, decreasing the current central frequency by the frequency increment, $\Delta f$, and return to step h.

l. cause frequency tuning of the rejection band, increasing the current central frequency by the frequency increment, $\Delta f$, and repeat steps d. and e.

The controller is arranged to operate iteratively which may enable it automatically to find the optimal optical carrier suppression ratio for a chosen performance indicator, and tune the frequency of the rejection band and the amplifier gain accordingly. The iterative operation of the controller may enable the optical receiver to be fully reconfigurable.

In an embodiment, the controller is arranged to generate at least one control signal arranged to cause the frequency tuning of the rejection band of the carrier suppression element and to cause the gain of the optical amplifier to change by an amount to restore the optical power of the SCM optical signal received at the photoreceiver to said initial value of the optical power.

In an embodiment, the photoreceiver is arranged to measure an optical power of the SCM optical signal received at the photoreceiver and is arranged to provide the optical power to the controller.

In an embodiment, the carrier suppression element is a tunable notch filter. Use of a tunable notch filter may enable the carrier to subcarrier amplitude ratio to be finely adjusted, by finely tuning the central frequency of the notch filter to vary the amount of suppression applied to the optical carrier. Use of a notch filter may ensure that the rejection band is narrow enough to avoid any impact of optical subcarriers located close to the optical carrier.

In an embodiment, the carrier suppression element comprises one of a microring resonator and an optical waveguide grating filter. Use of a microring resonator or an optical waveguide grating filter may ensure that the CSE rejection band is narrow enough to avoid any impact of optical subcarriers located close to the optical carrier. Use of a microring resonator and an optical waveguide grating filter may enable the carrier to subcarrier amplitude ratio to be finely adjusted, by finely tuning the central frequency of the notch filter to vary the amount of suppression applied to the optical carrier. Use of a microring resonator may enable the optical receiver to be integrated in a single photonic integrated circuit.

In an embodiment, the optical waveguide grating filter is an optical fibre grating filter, such as a fibre Bragg grating.

In an embodiment, there is a preselected frequency separation between the optical carrier and the optical subcarrier. The rejection band of the carrier suppression element has a bandwidth that is less than said preselected frequency separation. This may ensure that the CSE rejection band is narrow enough to avoid any impact of optical subcarriers located close to the optical carrier.

In an embodiment, the optical receiver further comprises a demultiplexer having an input and a plurality of outputs. The demultiplexer input is arranged to receive a wavelength division multiplexed, WDM, SCM optical signal comprising a plurality of said subcarrier multiplexing, SCM, optical signals. Each said SCM optical signal has a different wavelength spectrum. Each output of the demultiplexer is coupled to a respective line comprising a said carrier suppression element, a said optical amplifier and a said photoreceiver. The controller is arranged to, for each line, cause frequency tuning of the respective rejection band and variation of the gain of the respective optical amplifier so as to adjust the ratio of the optical power of the respective optical carrier at the respective photoreceiver to the optical power of the respective optical subcarrier at the respective photoreceiver based on the indication of performance of the SCM optical signal. The optical receiver may adjust the carrier to subcarrier power ratio for receiving all of the wavelengths of a WDM-SCM optical signal. The optical receiver may therefore also be fully reconfigurable.

In an embodiment, the controller is arranged to perform steps a. to l. for each line. The optical receiver may adjust the carrier to subcarrier power ratio for receiving all of the wavelengths of a WDM-SCM optical signal. The optical receiver may also be fully reconfigurable.

In an embodiment, the controller may be arranged to provide a monitoring signal comprising an indication of at least one of the current value of the optical of the SCM optical signal, the central frequency of the CSE rejection band and the gain of the optical amplifier. This may enable the optical receiver to provide monitoring functionalities for each of the SCM optical signals. The optical receiver may enable penalties from each of the SCM optical signals from a WDM SCM optical signal to be correlated to provide information about optical impairments in the optical link.

In an embodiment, the optical receiver further comprises a noise reduction filter between the or each optical amplifier and photoreceiver. Each noise reduction filter acts to remove amplified spontaneous emission, ASE, noise generated by the respective optical amplifier. In an embodiment, the noise reduction filter is an optical bandpass filter.

A second aspect of the invention provides an optical transceiver comprising an optical receiver comprising an input, a carrier suppression element, an optical amplifier, a photoreceiver and a controller. The input is arranged to receive a subcarrier multiplexing, SCM, optical signal. The SCM optical signal comprises an optical carrier and an optical subcarrier, each having a respective optical power. The carrier suppression element is arranged to receive the SCM optical signal and has a rejection band that is tunable in frequency to partially suppress the optical carrier by a variable amount. The optical amplifier has a variable gain and is arranged to receive the SCM optical signal output from the carrier suppression element and is arranged to amplify the optical carrier and the optical subcarrier. The photoreceiver is arranged to receive the SCM optical signal output from the optical amplifier. The controller is arranged to cause frequency tuning of the rejection band of the carrier suppression element and variation of the gain of the optical amplifier so as to adjust a ratio of the optical power of the optical carrier at the photoreceiver to the optical power of the optical subcarrier at the photoreceiver based on an indication of performance of the SCM optical signal.

The optical transceiver may improve the link performance for RoF transmission by using SCM by optimizing carrier suppression at the receiver side of the link. By adjusting the optical carrier to subcarrier optical power ratio based on the indication of performance of the SCM optical signal the ratio may be optimized. The optical receiver may control the carrier to subcarrier amplitude ratio by controlling an amount of suppression applied to a received optical carrier and by controlling an amount of gain applied to the SCM optical signal following carrier suppression. The optical receiver operates at the physical layer and does not require any inband or outband communication between the optical receiver and a transmitter generating the SCM optical signal that is being received. Operation at the physical layer also means that the optical receiver is able to operate with low latency. The optical receiver is fully transparent with respect to the bandwidth and modulation format of the SCM optical signal. The optical receiver may provide an improvement in optical link performance in terms of link power budget and SFDR compared with known SCM techniques.

In an embodiment, the controller is arranged to monitor a performance indicator of the SCM optical signal. The controller is arranged to cause frequency tuning of the rejection band of the carrier suppression element and variation of the gain of the optical amplifier so as to adjust the ratio of the optical power of the optical carrier at the photoreceiver to the optical power of the optical subcarrier at the photoreceiver based on the performance indicator. This may enable the optical receiver to find the optimal optical carrier suppression ratio for a chosen performance indicator, and tune the frequency of the rejection band and the amplifier gain accordingly.

In an embodiment, the input is arranged to receive the SCM optical signal from an optical link. The performance indicator is a link performance indicator of the optical link. The optical receiver may therefore determine an appropriate set of parameters (frequency of the rejection band and the amplifier gain) in order to optimize the performance of the optical link. The optical receiver may enable a precise calibration of the optical carrier power by monitoring an appropriate link performance indicator. The optical receiver may enable the optimal value of the carrier-subcarrier ratio to be determined which maximizes the chosen link performance indicator, LPI.

In an embodiment, the link performance indicator comprises at least one link parameter, such as end to end error-vector magnitude, EVM, link gain and spurious free dynamic range, SFDR. The optical receiver may enable a precise calibration of the optical carrier power by monitoring an appropriate link performance indicator, that may include one or more link parameters. The optical receiver may enable the optimal value of the carrier-subcarrier ratio to be determined which maximizes the chosen link performance indicator, LPI.

In an embodiment, the link performance indicator comprises one of achievable effective power of the optical subcarriers, effective modulation index of the SCM optical signal after carrier suppression, EVM, SFDR, gain of the optical link, and a noise figure of the optical link. The optical receiver may enable a precise calibration of the optical carrier power by monitoring an appropriate link performance indicator, that may include one or more link parameters. The optical receiver may enable the optimal value of the carrier-subcarrier ratio to be determined which maximizes the chosen link performance indicator, LPI.

This may enable the optical transceiver to find the optimal optical carrier suppression ratio for a chosen performance indicator, and tune the frequency of the rejection band and the amplifier gain accordingly.

In an embodiment, the controller is arranged to perform steps a. to l., as follows:

a. obtain a current central frequency of the rejection band of the carrier suppression element, a current value of the performance indicator and a current gain of the optical amplifier;

b. receive an initial value of the optical power of the SCM optical signal received at the photoreceiver;

c. cause frequency tuning of the rejection band, increasing the current central frequency by a frequency increment, $\Delta f$;

d. receive a current value of the optical power of the SCM optical signal received at the photoreceiver;

e. cause the gain of the optical amplifier to change by an amount to restore the optical power of the SCM optical signal received at the photoreceiver to said initial value of the optical power;

f. obtain a current value of the performance indicator and compare the current value to the previous value of the performance indicator, and:

i. if the current value is greater than the previous value, return to step c.;

ii. if the current value is less than or equal to the previous value, continue to step g.

g. cause frequency tuning of the rejection band, decreasing the current central frequency by twice the frequency increment, $2\Delta f$;

h. receive a current value of the optical power of the SCM optical signal received at the photoreceiver;

i. cause the gain of the optical amplifier to change by an amount to restore the optical power of the SCM optical signal received at the photoreceiver to said initial value of the optical power;

j. obtain a current value of the performance indicator and compare the current value to the previous value of the performance indicator, and:

i. if the current value is greater than the previous value, continue to step k.;

ii. if the current value is less than or equal to the previous value, continue to step l.

k. cause frequency tuning of the rejection band, decreasing the current central frequency by the frequency increment, $\Delta f$, and return to step h.

l. cause frequency tuning of the rejection band, increasing the current central frequency by the frequency increment, $\Delta f$, and repeat steps d. and e.

The controller is arranged to operate iteratively which may enable it automatically to find the optimal optical carrier suppression ratio for a chosen performance indicator, and tune the frequency of the rejection band and the amplifier gain accordingly. The iterative operation of the controller may enable the optical receiver to be fully reconfigurable.

In an embodiment, the controller is arranged to generate at least one control signal arranged to cause the frequency tuning of the rejection band of the carrier suppression element and to cause the gain of the optical amplifier to change by an amount to restore the optical power of the SCM optical signal received at the photoreceiver to said initial value of the optical power.

In an embodiment, the photoreceiver is arranged to measure an optical power of the SCM optical signal received at the photoreceiver and is arranged to provide the optical power to the controller.

In an embodiment, the carrier suppression element is a tunable notch filter. Use of a tunable notch filter may enable the carrier to subcarrier amplitude ratio to be finely adjusted, by finely tuning the central frequency of the notch filter to vary the amount of suppression applied to the optical carrier. Use of a notch filter may ensure that the rejection band is narrow enough to avoid any impact of optical subcarriers located close to the optical carrier.

In an embodiment, the carrier suppression element comprises one of a microring resonator and an optical waveguide grating filter. Use of a microring resonator or an optical waveguide grating filter may ensure that the CSE rejection band is narrow enough to avoid any impact of optical subcarriers located close to the optical carrier. Use of a microring resonator and an optical waveguide grating filter may enable the carrier to subcarrier amplitude ratio to be finely adjusted, by finely tuning the central frequency of the notch filter to vary the amount of suppression applied to the optical carrier. Use of a microring resonator may enable the optical receiver to be integrated in a single photonic integrated circuit.

In an embodiment, the optical waveguide grating filter is an optical fibre grating filter, such as a fibre Bragg grating.

In an embodiment, there is a preselected frequency separation between the optical carrier and the optical subcarrier. The rejection band of the carrier suppression element has a bandwidth that is less than said preselected frequency separation. This may ensure that the CSE rejection band is narrow enough to avoid any impact of optical subcarriers located close to the optical carrier.

In an embodiment, the optical receiver further comprises a demultiplexer having an input and a plurality of outputs. The demultiplexer input is arranged to receive a wavelength division multiplexed, WDM, SCM optical signal comprising a plurality of said subcarrier multiplexing, SCM, optical signals. Each said SCM optical signal has a different wavelength spectrum. Each output of the demultiplexer is coupled to a respective line comprising a said carrier suppression element, a said optical amplifier and a said photoreceiver. The controller is arranged to, for each line, cause frequency tuning of the respective rejection band and variation of the gain of the respective optical amplifier so as to adjust the ratio of the optical power of the respective optical carrier at the respective photoreceiver to the optical power of the respective optical subcarrier at the respective photoreceiver based on the indication of performance of the SCM optical signal. The optical receiver may adjust the carrier to subcarrier power ratio for receiving all of the wavelengths of a WDM-SCM optical signal. The optical receiver may therefore also be fully reconfigurable.

In an embodiment, the controller is arranged to perform steps a. to l. for each line. The optical receiver may adjust the carrier to subcarrier power ratio for receiving all of the wavelengths of a WDM-SCM optical signal. The optical receiver may also be fully reconfigurable.

In an embodiment, the controller may be arranged to provide a monitoring signal comprising an indication of at least one of the current value of the optical of the SCM optical signal, the central frequency of the CSE rejection band and the gain of the optical amplifier. This may enable the optical receiver to provide monitoring functionalities for each of the SCM optical signals. The optical receiver may enable penalties from each of the SCM optical signals from a WDM SCM optical signal to be correlated to provide information about optical impairments in the optical link.

In an embodiment, the optical receiver further comprises a noise reduction filter between the or each optical amplifier and photoreceiver. Each noise reduction filter acts to remove amplified spontaneous emission, ASE, noise generated by the respective optical amplifier. In an embodiment, the noise reduction filter is an optical bandpass filter.

A third aspect of the invention provides a communications network node comprising an optical receiver comprising an input, a carrier suppression element, an optical amplifier, a photoreceiver and a controller. The input is arranged to receive a subcarrier multiplexing, SCM, optical signal. The SCM optical signal comprises an optical carrier and an optical subcarrier, each having a respective optical power. The carrier suppression element is arranged to receive the SCM optical signal and has a rejection band that is tunable in frequency to partially suppress the optical carrier by a variable amount. The optical amplifier has a variable gain and is arranged to receive the SCM optical signal output from the carrier suppression element and is arranged to amplify the optical carrier and the optical subcarrier. The photoreceiver is arranged to receive the SCM optical signal output from the optical amplifier. The controller is arranged to cause frequency tuning of the rejection band of the carrier suppression element and variation of the gain of the optical amplifier so as to adjust a ratio of the optical power of the optical carrier at the photoreceiver to the optical power of the optical subcarrier at the photoreceiver based on an indication of performance of the SCM optical signal.

The node may improve the link performance for RoF transmission by using SCM by optimizing carrier suppression at the receiver side of the link. By adjusting the optical carrier to subcarrier optical power ratio based on the indication of performance of the SCM optical signal the ratio may be optimized. The optical receiver may control the carrier to subcarrier amplitude ratio by controlling an amount of suppression applied to a received optical carrier and by controlling an amount of gain applied to the SCM optical signal following carrier suppression. The optical receiver operates at the physical layer and does not require any inband or outband communication between the optical receiver and a transmitter generating the SCM optical signal that is being received. Operation at the physical layer also means that the optical receiver is able to operate with low latency. The optical receiver is fully transparent with respect to the bandwidth and modulation format of the SCM optical signal. The optical receiver may provide an improvement in optical link performance in terms of link power budget and SFDR compared with known SCM techniques.

In an embodiment, the controller is arranged to monitor a performance indicator of the SCM optical signal. The controller is arranged to cause frequency tuning of the rejection band of the carrier suppression element and variation of the gain of the optical amplifier so as to adjust the ratio of the optical power of the optical carrier at the photoreceiver to the optical power of the optical subcarrier at the photoreceiver based on the performance indicator. This may enable the optical receiver to find the optimal optical carrier suppression ratio for a chosen performance indicator, and tune the frequency of the rejection band and the amplifier gain accordingly.

In an embodiment, the input is arranged to receive the SCM optical signal from an optical link. The performance indicator is a link performance indicator of the optical link. The optical receiver may therefore determine an appropriate set of parameters (frequency of the rejection band and the amplifier gain) in order to optimize the performance of the optical link. The optical receiver may enable a precise calibration of the optical carrier power by monitoring an appropriate link performance indicator. The optical receiver may enable the optimal value of the carrier-subcarrier ratio to be determined which maximizes the chosen link performance indicator, LPI.

In an embodiment, the link performance indicator comprises at least one link parameter, such as end to end error-vector magnitude, EVM, link gain and spurious free dynamic range, SFDR. The optical receiver may enable a precise calibration of the optical carrier power by monitoring an appropriate link performance indicator, that may include one or more link parameters. The optical receiver may enable the optimal value of the carrier-subcarrier ratio to be determined which maximizes the chosen link performance indicator, LPI.

In an embodiment, the link performance indicator comprises one of achievable effective power of the optical subcarriers, effective modulation index of the SCM optical signal after carrier suppression, EVM, SFDR, gain of the optical link, and a noise figure of the optical link. The optical receiver may enable a precise calibration of the optical carrier power by monitoring an appropriate link performance indicator, that may include one or more link parameters. The optical receiver may enable the optimal value of the carrier-subcarrier ratio to be determined which maximizes the chosen link performance indicator, LPI.

This may enable the optical transceiver to find the optimal optical carrier suppression ratio for a chosen performance indicator, and tune the frequency of the rejection band and the amplifier gain accordingly.

In an embodiment, the controller is arranged to perform steps a. to l., as follows:

a. obtain a current central frequency of the rejection band of the carrier suppression element, a current value of the performance indicator and a current gain of the optical amplifier;

b. receive an initial value of the optical power of the SCM optical signal received at the photoreceiver;

c. cause frequency tuning of the rejection band, increasing the current central frequency by a frequency increment, $\Delta f$;

d. receive a current value of the optical power of the SCM optical signal received at the photoreceiver;

e. cause the gain of the optical amplifier to change by an amount to restore the optical power of the SCM optical signal received at the photoreceiver to said initial value of the optical power;

f. obtain a current value of the performance indicator and compare the current value to the previous value of the performance indicator, and:

i. if the current value is greater than the previous value, return to step c.;

ii. if the current value is less than or equal to the previous value, continue to step g.

g. cause frequency tuning of the rejection band, decreasing the current central frequency by twice the frequency increment, $2\Delta f$;

h. receive a current value of the optical power of the SCM optical signal received at the photoreceiver;

i. cause the gain of the optical amplifier to change by an amount to restore the optical power of the SCM optical signal received at the photoreceiver to said initial value of the optical power;

j. obtain a current value of the performance indicator and compare the current value to the previous value of the performance indicator, and:

i. if the current value is greater than the previous value, continue to step k.;

ii. if the current value is less than or equal to the previous value, continue to step l.

k. cause frequency tuning of the rejection band, decreasing the current central frequency by the frequency increment, $\Delta f$, and return to step h.

l. cause frequency tuning of the rejection band, increasing the current central frequency by the frequency increment, $\Delta f$, and repeat steps d. and e.

The controller is arranged to operate iteratively which may enable it automatically to find the optimal optical carrier suppression ratio for a chosen performance indicator, and tune the frequency of the rejection band and the amplifier gain accordingly. The iterative operation of the controller may enable the optical receiver to be fully reconfigurable.

In an embodiment, the controller is arranged to generate at least one control signal arranged to cause the frequency tuning of the rejection band of the carrier suppression element and to cause the gain of the optical amplifier to change by an amount to restore the optical power of the SCM optical signal received at the photoreceiver to said initial value of the optical power.

In an embodiment, the photoreceiver is arranged to measure an optical power of the SCM optical signal received at the photoreceiver and is arranged to provide the optical power to the controller.

In an embodiment, the carrier suppression element is a tunable notch filter. Use of a tunable notch filter may enable the carrier to subcarrier amplitude ratio to be finely adjusted, by finely tuning the central frequency of the notch filter to vary the amount of suppression applied to the optical carrier. Use of a notch filter may ensure that the rejection band is narrow enough to avoid any impact of optical subcarriers located close to the optical carrier.

In an embodiment, the carrier suppression element comprises one of a microring resonator and an optical waveguide grating filter. Use of a microring resonator or an optical waveguide grating filter may ensure that the CSE rejection band is narrow enough to avoid any impact of optical subcarriers located close to the optical carrier. Use of a microring resonator and an optical waveguide grating filter may enable the carrier to subcarrier amplitude ratio to be finely adjusted, by finely tuning the central frequency of the notch filter to vary the amount of suppression applied to the optical carrier. Use of a microring resonator may enable the optical receiver to be integrated in a single photonic integrated circuit.

In an embodiment, the optical waveguide grating filter is an optical fibre grating filter, such as a fibre Bragg grating.

In an embodiment, there is a preselected frequency separation between the optical carrier and the optical subcarrier. The rejection band of the carrier suppression element has a bandwidth that is less than said preselected frequency separation. This may ensure that the CSE rejection band is narrow enough to avoid any impact of optical subcarriers located close to the optical carrier.

In an embodiment, the optical receiver further comprises a demultiplexer having an input and a plurality of outputs. The demultiplexer input is arranged to receive a wavelength division multiplexed, WDM, SCM optical signal comprising a plurality of said subcarrier multiplexing, SCM, optical signals. Each said SCM optical signal has a different wavelength spectrum. Each output of the demultiplexer is coupled to a respective line comprising a said carrier suppression element, a said optical amplifier and a said photoreceiver. The controller is arranged to, for each line, cause frequency tuning of the respective rejection band and variation of the gain of the respective optical amplifier so as to adjust the ratio of the optical power of the respective optical carrier at the respective photoreceiver to the optical power of the respective optical subcarrier at the respective photoreceiver based on the indication of performance of the SCM optical signal. The optical receiver may adjust the carrier to subcarrier power ratio for receiving all of the wavelengths of a WDM-SCM optical signal. The optical receiver may therefore also be fully reconfigurable.

In an embodiment, the controller is arranged to perform steps a. to l. for each line. The optical receiver may adjust the carrier to subcarrier power ratio for receiving all of the wavelengths of a WDM-SCM optical signal. The optical receiver may also be fully reconfigurable.

In an embodiment, the controller may be arranged to provide a monitoring signal comprising an indication of at least one of the current value of the optical of the SCM optical signal, the central frequency of the CSE rejection band and the gain of the optical amplifier. This may enable the optical receiver to provide monitoring functionalities for each of the SCM optical signals. The optical receiver may enable penalties from each of the SCM optical signals from a WDM SCM optical signal to be correlated to provide information about optical impairments in the optical link.

In an embodiment, the optical receiver further comprises a noise reduction filter between the or each optical amplifier and photoreceiver. Each noise reduction filter acts to remove amplified spontaneous emission, ASE, noise generated by the respective optical amplifier. In an embodiment, the noise reduction filter is an optical bandpass filter.

A fourth aspect of the invention provides a method of receiving an optical communications signal. The method comprises steps A. to E., as follows:

A. receiving a subcarrier multiplexing, SCM, optical signal comprising an optical carrier and an optical subcarrier, each having a respective optical power;

B. filtering the optical carrier using a carrier suppression element having a rejection band that is tunable in frequency to partially suppress the optical carrier by a variable amount;

C. amplifying the optical carrier and the optical subcarrier by a variable amount by applying a variable optical gain;

D. receiving and photodetecting the amplified SCM optical signal; and

E. tuning the frequency of the rejection band and varying the applied optical gain so as to adjust a ratio of the optical power of the optical carrier at the photoreceiver to the optical power of the optical subcarrier at the photoreceiver based on an indication of performance of the SCM optical signal.

The method may improve the link performance for RoF transmission by using SCM by optimizing carrier suppression at the receiver side of an optical link. By adjusting the optical carrier to subcarrier optical power ratio based on the indication of performance of the SCM optical signal the ratio may be optimized. The method may control the carrier to subcarrier amplitude ratio by controlling an amount of suppression applied to a received optical carrier and by controlling an amount of gain applied to the SCM optical signal following carrier suppression. The method operates at the physical layer and does not require any inband or outband communication between an optical receiver and a transmitter generating the SCM optical signal that is being received. Operation at the physical layer also means that the method is able to operate with low latency. The method is fully transparent with respect to the bandwidth and modulation format of the SCM optical signal. The method may provide an improvement in optical link performance in terms of link power budget and SFDR compared with known SCM techniques.

In an embodiment, the method further comprises monitoring a performance indicator of the SCM optical signal. The method comprises frequency tuning the rejection band and varying the gain of the optical amplifier so as to adjust the ratio of the optical power of the optical carrier at the photoreceiver to the optical power of the optical subcarrier at the photoreceiver based on the performance indicator. This may enable the optimal optical carrier suppression ratio to be found for a chosen performance indicator, enabling tuning of the frequency of the rejection band and the amplifier gain accordingly.

In an embodiment, the SCM optical signal is received from an optical link and the performance indicator is a link performance indicator of the optical link. The method may therefore determine an appropriate set of parameters (frequency of the rejection band and the amplifier gain) in order to optimize the performance of the optical link. The method may enable a precise calibration of the optical carrier power by monitoring an appropriate link performance indicator. The method may enable the optimal value of the carrier-subcarrier ratio to be determined which maximizes the chosen link performance indicator, LPI.

In an embodiment, the link performance indicator comprises at least one link parameter, such as end to end error-vector magnitude, EVM, link gain and spurious free dynamic range, SFDR. The method may enable a precise calibration of the optical carrier power by monitoring an appropriate link performance indicator, that may include one or more link parameters. The method may enable the optimal value of the carrier-subcarrier ratio to be determined which maximizes the chosen link performance indicator, LPI.

In an embodiment, the link performance indicator comprises one of achievable effective power of the optical subcarriers, effective modulation index of the SCM optical signal after carrier suppression, EVM, SFDR, gain of the optical link, and a noise figure of the optical link. The method may enable a precise calibration of the optical carrier power by monitoring an appropriate link performance indicator, that may include one or more link parameters. The method may enable the optimal value of the carrier-subcarrier ratio to be determined which maximizes the chosen link performance indicator, LPI.

This may enable the method to find the optimal optical carrier suppression ratio for a chosen performance indicator, and tune the frequency of the rejection band and the amplifier gain accordingly.

In an embodiment, step D. further comprises measuring an initial value of the optical power of the amplified SCM optical signal. Step E. comprises steps a. to l., as follows:

a. obtaining a current central frequency of the rejection band of the carrier suppression element, a current value of the performance indicator and a current value of the optical gain;

b. receiving the initial value of the optical power of the amplified SCM optical signal;

c. frequency tuning the rejection band, increasing the current central frequency by a frequency increment, $\Delta f$;

d. receiving a current value of the optical power of the amplified SCM optical signal;

e. changing the gain of the optical amplifier by an amount to restore the optical power of the amplified SCM optical signal to the initial value;

f. obtaining a current value of the performance indicator and comparing the current value to the previous value of the performance indicator, and:

i. if the current value is greater than the previous value, returning to step c.;

ii. if the current value is less than or equal to the previous value, continuing to step g.

g. frequency tuning the rejection band, decreasing the current central frequency by twice the frequency increment, $2\Delta f$;

h. receiving a current value of the optical power of the amplified SCM optical signal;

i. changing the gain of the optical amplifier by an amount to restore the optical power of the amplified SCM optical signal to the initial value;

j. obtaining a current value of the performance indicator and comparing the current value to the previous value of the performance indicator, and:

i. if the current value is greater than the previous value, continuing to step k.;

ii. if the current value is less than or equal to the previous value, continuing to step l.

k. frequency tuning the rejection band, decreasing the current central frequency by the frequency increment, $\Delta f$, and returning to step h.

l. frequency tuning the rejection band, increasing the current central frequency by the frequency increment, $\Delta f$, and repeating step e.

The method is arranged to operate iteratively which may enable it automatically to find the optimal optical carrier suppression ratio for a chosen performance indicator, and tune the frequency of the rejection band and the amplifier gain accordingly.

In an embodiment, the method comprises generating at least one control signal arranged to cause the frequency tuning of the rejection band of the carrier suppression element and to cause the gain of the optical amplifier to change by an amount to restore the optical power of the SCM optical signal received at the photoreceiver to said initial value of the optical power.

In an embodiment, the carrier suppression element is a tunable notch filter. Use of a tunable notch filter may enable the carrier to subcarrier amplitude ratio to be finely adjusted, by finely tuning the central frequency of the notch filter to vary the amount of suppression applied to the optical carrier. Use of a notch filter may ensure that the rejection band is narrow enough to avoid any impact of optical subcarriers located close to the optical carrier.

In an embodiment, the carrier suppression element comprises one of a microring resonator and an optical waveguide grating filter. Use of a microring resonator or an optical waveguide grating filter may ensure that the CSE rejection band is narrow enough to avoid any impact of optical subcarriers located close to the optical carrier. Use of a microring resonator and an optical waveguide grating filter may enable the carrier to subcarrier amplitude ratio to be finely adjusted, by finely tuning the central frequency of the notch filter to vary the amount of suppression applied to the optical carrier. Use of a microring resonator may enable the optical receiver to be integrated in a single photonic integrated circuit.

In an embodiment, there is a preselected frequency separation between the optical carrier and the optical subcarrier. The rejection band of the carrier suppression element has a bandwidth that is less than said preselected frequency separation. This may ensure that the CSE rejection band is narrow enough to avoid any impact of optical subcarriers located close to the optical carrier.

In an embodiment, step A. comprises receiving a wavelength division multiplexed, WDM, SCM optical signal comprising a plurality of said subcarrier multiplexing, SCM, optical signals. Each SCM optical signal has a different wavelength spectrum. Step A. comprises demultiplexing the WDM SCM optical signal to obtain the plurality of SCM optical signals. The method comprises performing steps B. to E. on each of the SCM optical signals. The method may adjust the carrier to subcarrier power ratio for all of the wavelengths of a WDM-SCM optical signal.

In an embodiment, the method comprises generating a monitoring signal comprising an indication of at least one of the current value of the optical of the SCM optical signal, the central frequency of the CSE rejection band and the gain of the optical amplifier. This may enable the method to provide monitoring functionalities for each of the SCM optical signals. The method may enable penalties from each of the SCM optical signals from a WDM SCM optical signal to be correlated to provide information about optical impairments in the optical link.

In an embodiment, the method further comprises performing noise reduction filtering on each amplified SCM optical signal. This may remove amplified spontaneous emission, ASE, noise added to each SCM optical signal during amplification.

A fifth aspect of the invention provides a computer program, comprising instructions which, when executed on at least one processor, cause the at least one processor to carry out any of the above steps of the method of receiving an optical communications signal.

A sixth aspect of the invention provides a carrier a computer program, comprising instructions which, when executed on at least one processor, cause the at least one processor to carry out any of the above steps of the method of receiving an optical communications signal. The carrier is one of an electronic signal, optical signal, radio signal, or computer readable storage medium.

Embodiments of the invention will now be described, by way of example only, with reference to the accompanying drawings.

DETAILED DESCRIPTION

The same reference numbers will used for corresponding features in different embodiments.

Figure 1:
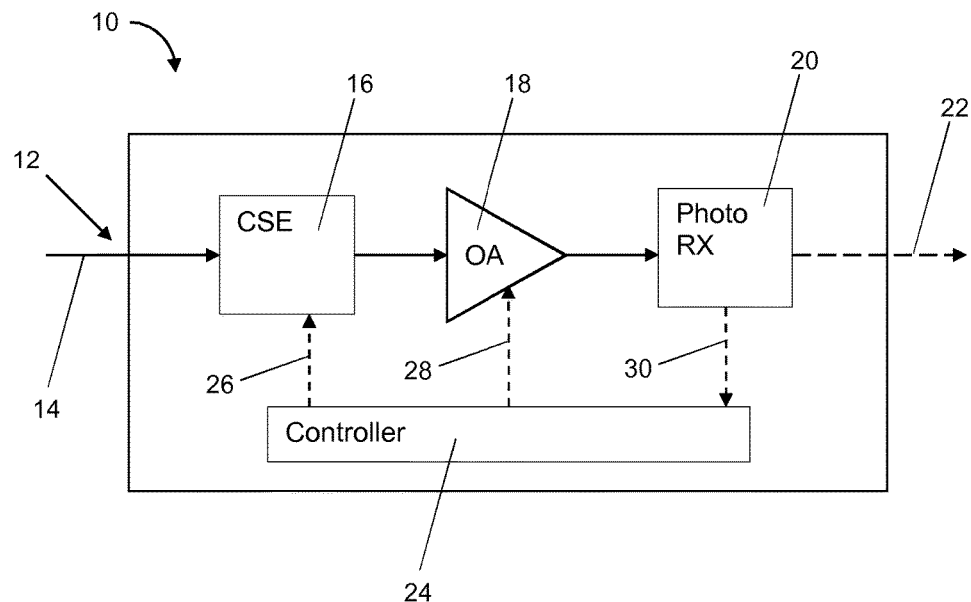
FIG. 1 is a schematic representation of an optical receiver according to a first embodiment of the invention.

Referring to FIG. 1, a first embodiment of the invention provides an optical receiver 10 comprising an input 12, a carrier suppression element, CSE, 16, an optical amplifier, OA, 18, a photoreceiver, PhotoRx, 20 and a controller 24.

The input 12 is arranged to receive a subcarrier multiplexing, SCM, optical signal 14 comprising an optical carrier and an optical subcarrier. The optical carrier and the optical subcarrier each have a respective optical power. The CSE 16 is arranged to receive the SCM optical signal. The CSE has a rejection band that is tunable in frequency to partially suppress the optical carrier by a variable amount. The optical amplifier 18 has a variable gain and is arranged to receive the SCM optical signal output from the CSE. The optical amplifier is arranged to amplify the optical carrier and the optical subcarrier. The photoreceiver 20 is arranged to receive the SCM optical signal output from the optical amplifier.

The controller 24 is arranged to cause frequency tuning of the rejection band of the CSE and to cause variation of the gain of the optical amplifier, so as to adjust a ratio of the optical power of the optical carrier at the photoreceiver to the optical power of the optical subcarrier at the photoreceiver based on an indication of performance of the SCM optical signal.

In a second embodiment, described also with reference to FIG. 1, the controller 24 is arranged to monitor a performance indicator of the SCM optical signal. The controller is arranged to cause frequency tuning of the rejection band and variation of the gain of the optical amplifier so as to adjust the ratio of the optical power of the optical carrier at the photoreceiver to the optical power of the optical subcarrier at the photoreceiver based on the performance indicator. Frequency tuning is performed until the optical carrier to subcarrier optical power ratio is optimized, which may be determined as being reached when the ratio is acceptably close to a preselected optimal value.

The input 12 is arranged to receive the SCM optical signal from an optical link and the performance indicator is a link performance indicator of the optical link. The link performance indicator may comprise at least one link parameter of the optical link, such as end to end error-vector magnitude, EVM, link gain and spurious free dynamic range, SFDR, of the SCM optical signal, achievable effective power of the optical subcarriers, effective modulation index of the SCM optical signal after carrier suppression, gain of the optical link, and a noise figure of the optical link.

In a third embodiment, described also with reference to FIG. 1, the controller 24 is arranged to perform steps a. to l., as follows:
  a. obtain a current central frequency of the rejection band of the carrier suppression element, a current value of the performance indicator and a current gain of the optical amplifier;
  b. receive an initial value of the optical power of the SCM optical signal received at the photoreceiver (30);
  c. cause frequency tuning (26) of the rejection band, increasing the current central frequency by a frequency increment, Δf;
  d. receive a current value of the optical power of the SCM optical signal received at the photoreceiver;
  e. cause the gain of the optical amplifier to change by an amount to restore the optical power of the SCM optical signal received at the photoreceiver to said initial value of the optical power (28);
  f. obtain a current value of the performance indicator and compare the current value to the previous value of the performance indicator, and:
    i. if the current value is greater than the previous value, return to step c.;
    ii. if the current value is less than or equal to the previous value, continue to step g.

g. cause frequency tuning of the rejection band, decreasing the current central frequency by twice the frequency increment, $2\Delta f$;

h. receive a current value of the optical power of the SCM optical signal received at the photoreceiver;

i. cause the gain of the optical amplifier to change by an amount to restore the optical power of the SCM optical signal received at the photoreceiver to said initial value of the optical power;

j. obtain a current value of the performance indicator and compare the current value to the previous value of the performance indicator, and:

i. if the current value is greater than the previous value, continue to step k.;

ii. if the current value is less than or equal to the previous value, continue to step l.

k. cause frequency tuning of the rejection band, decreasing the current central frequency by the frequency increment, $\Delta f$, and return to step h.

l. cause frequency tuning of the rejection band, increasing the current central frequency by the frequency increment, $\Delta f$, and repeat steps d. and e.

Figure 2:
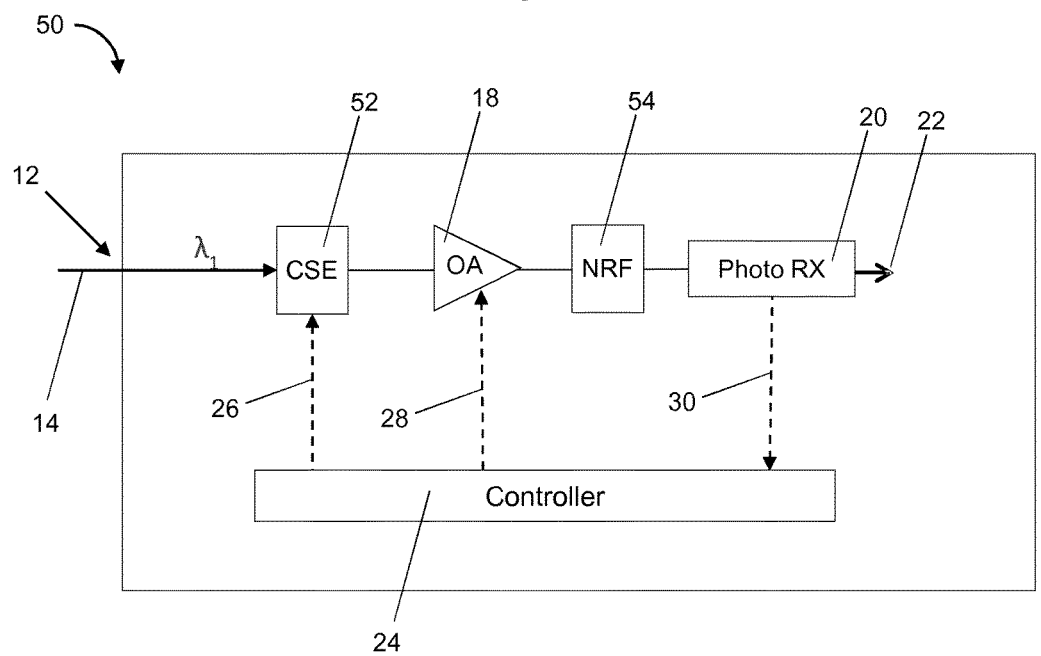
FIG. 2 is a schematic representation of an optical receiver according to a fourth embodiment of the invention.

Referring to FIG. 2, a fourth embodiment of the invention provides an optical receiver 50, which is substantially the same as the optical receiver 10 of FIG. 1, with the following modifications.

In this embodiment, the CSE 52 comprises a tunable notch filter, that is an optical filter having a passband and having a notch-shaped rejection band, tunable as described above. In this embodiment, the CSE comprises a microring resonator but the CSE 52 may alternatively comprise a waveguide grating filter, which may be an optical fibre grating filter such as a fibre Bragg grating.

There is a preselected frequency separation between the optical carrier and the optical subcarrier. The rejection band of the CSE has a bandwidth that is less than this preselected frequency separation, so only the optical carrier, and not any optical subcarrier, will be partially suppressed by the CSE.

The optical receiver 50 additionally comprises a noise reduction filter, NRF, 54, between the optical amplifier 18 and the photoreceiver 20. The NRF acts to remove amplified ASE noise, added to the SCM optical signal by the optical amplifier, before the amplified SCM optical signal is received and photodetected by the photoreceiver 20. The NRF is an optical bandpass filter.

The controller 24 of this embodiment is arranged to generate a control signal 26 arranged to cause the frequency tuning of the CSE and is arranged to generate a control signal 28 to cause the gain of the optical amplifier to change by an amount to restore the optical power of the SCM optical signal received at the photoreceiver to said initial value of the optical power.

Figure 3:
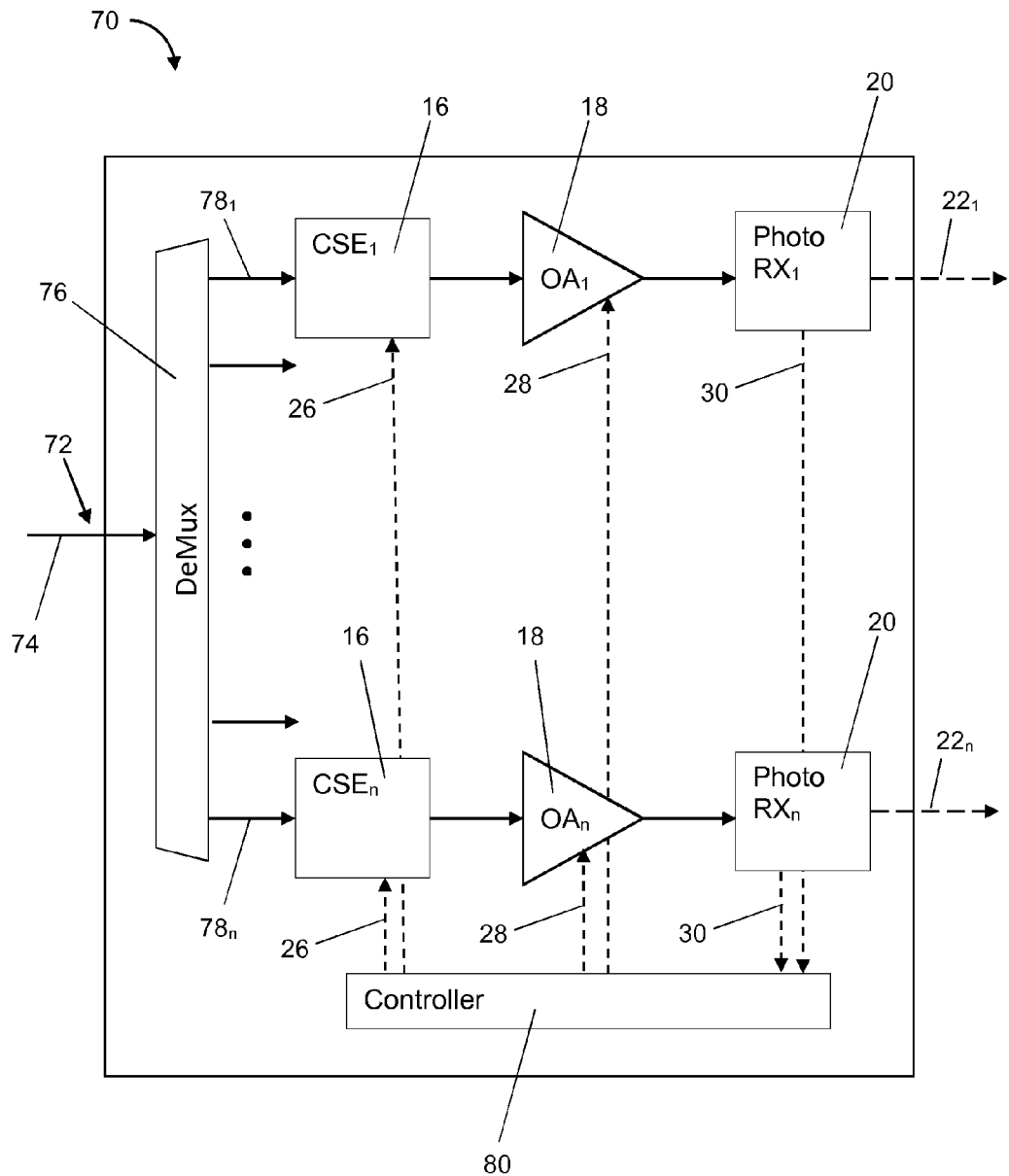
FIG. 3 is a schematic representation of an optical receiver according to a fifth embodiment of the invention.

Referring to FIG. 3, a fifth embodiment of the invention provides an optical receiver 70, which is substantially the same as the optical receiver 10 of FIG. 1, with the following modifications.

In this embodiment, the optical receiver further comprises a demultiplexer, DeMux, 76 having an input 72 and a plurality of outputs. The demultiplexer input is arranged to receive a WDM SCM optical signal 74 comprising a plurality of SCM optical signals, each having a different wavelength spectrum. The demultiplexer is arranged to demultiplex the input WDM SCM optical signal into said plurality of SCM optical signals 78.

Each output of the demultiplexer is coupled to a respective line comprising a CSE 52, an optical amplifier 18 and a photoreceiver 20, as described in any of the previous embodiments. The controller 80 of this embodiment is arranged to, for each line, cause frequency tuning of the rejection band of the respective CSE and variation of the gain of the respective optical amplifier, so as to adjust the ratio of the optical power of the optical carrier at the respective photoreceiver to the optical power of the optical subcarrier at the respective photoreceiver based on the indication of performance of the SCM optical signal.

Figure 4:
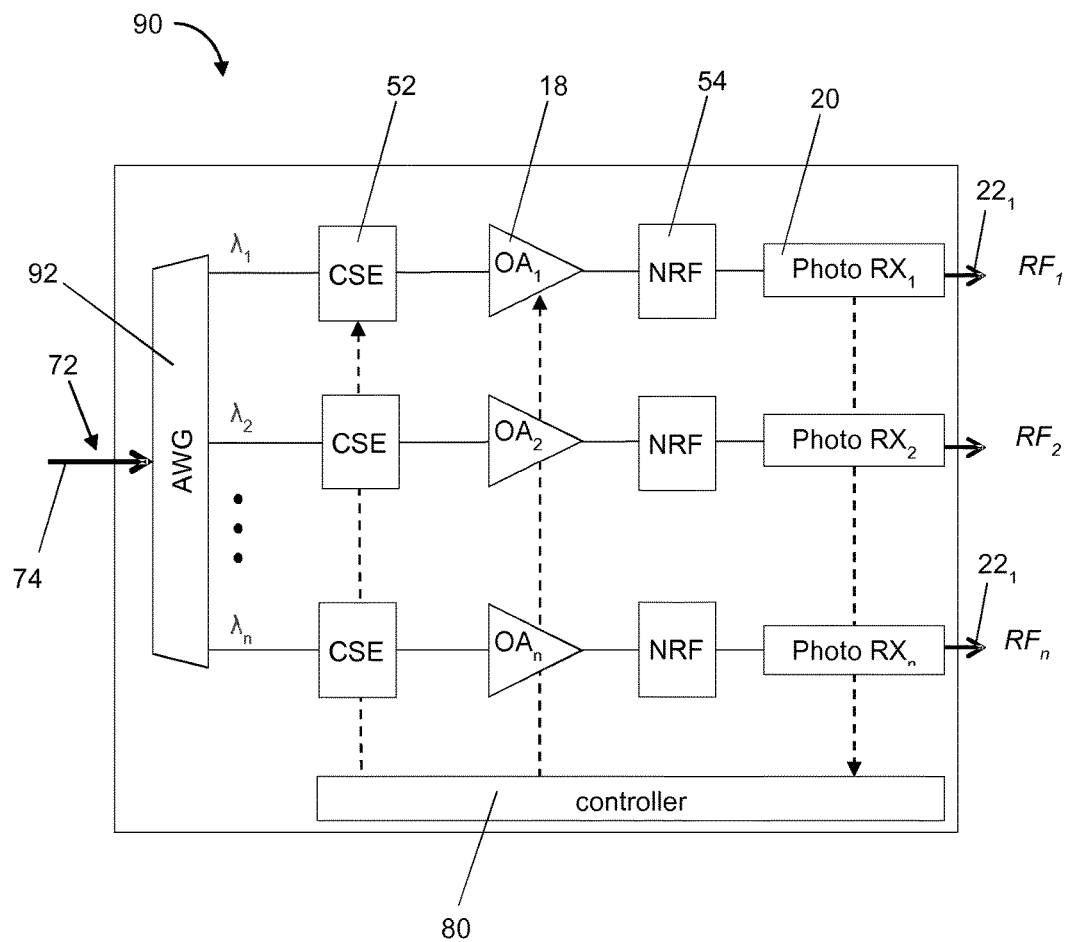
FIG. 4 is a schematic representation of an optical receiver according to a sixth embodiment of the invention.

Referring to FIG. 4, a sixth embodiment of the invention provides an optical receiver 90, which is substantially the same as the optical receiver 70 of FIG. 3, with the following modifications.

In this embodiment, the demultiplexer is an arrayed waveguide grating, AWG 92, the CSE 52 is a tunable notch filter, implemented as a microring resonator, and each line additionally comprises an NRF 54 between the respective optical amplifier 18 and photoreceiver 20, as described above with reference to FIG. 2. The CSE 52 may alternatively be implemented as a waveguide grating filter, which may be an optical fibre grating filter such as a fibre Bragg grating.

In operation, the incoming WDM SCM 74 signal is split by the AWG 92 into a plurality, n, of SCM optical signals, each of a different wavelength, $\lambda_1$-$\lambda_n$. The SCM optical signal of each different wavelength is processed by a dedicated line comprising a CSE 52, an optical amplifier 18, an NRF 54 and a photoreceiver 20. The CSE suppresses the optical carrier and the central frequency of the rejection band of the CSE can be finely changed to adjust the optical carrier to optical subcarrier amplitude ratio. The notch width, i.e. the width of the rejection band, has to be narrow enough to avoid any impact on sub-carriers placed close to the optical carrier.

In each line, the optical amplifier adjusts the optical power of the respective SCM optical signal after carrier suppression and the NRF, that is an optical pass band filter, rejects any ASE noise generated by the optical amplifier, before optical-electrical conversion by the photoreceiver 20. Following optical-electrical conversion, the resulting multiple radio signals in the SCM sub-carriers are processed in the electrical domain in the conventional manner, which will be well known to the person skilled in the art.

The controller implements steps a. to l. described above, iteratively to optimize the link performance for each optical carrier by tuning the central frequency of each CSE and the gain of each optical amplifier. The performance of the optical link is checked using Link Performance Indicator, LPI, that may include one or more link parameters; for example end to end EVM, link gain or SFDR.

Figure 5:
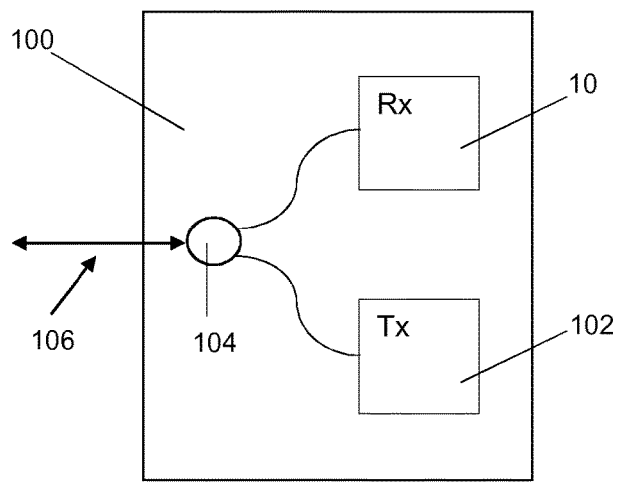
FIG. 5 is a schematic representation of an optical transceiver according to a seventh embodiment of the invention.

A seventh embodiment of the invention provides an optical transceiver 100, as illustrated in FIG. 5.

The optical transceiver 100 comprises an optical receiver, Rx, 10, as described above with reference to FIG. 1, and an optical transmitter, Tx, 102. It will be appreciated that any of the optical receivers 50, 70, 90 described above with reference to FIGS. 2 to 4 may alternatively be used. The transceiver input 106 is coupled to the optical receiver and the optical transmitter by an optical circulator 104.

Figure 6:
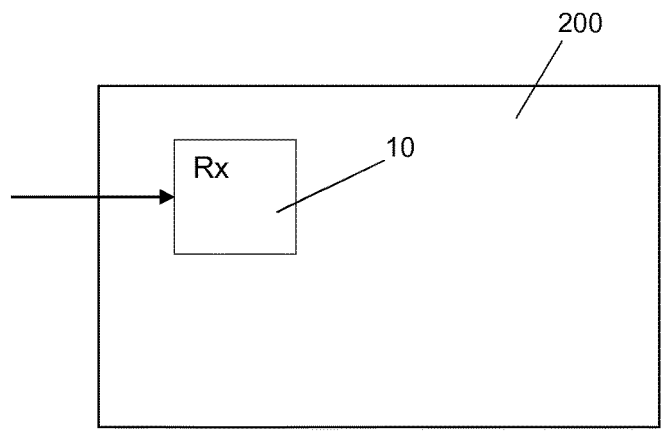
FIG. 6 is a schematic representation of communications network node according to an eighth embodiment of the invention.

An eighth embodiment of the invention provides communications network node 200, as illustrated in FIG. 6, comprising an optical receiver 10, as described above with reference to FIG. 1. It will be appreciated that any of the optical receivers 50, 70, 90 described above with reference to FIGS. 2 to 4 may alternatively be used.

Figure 7:
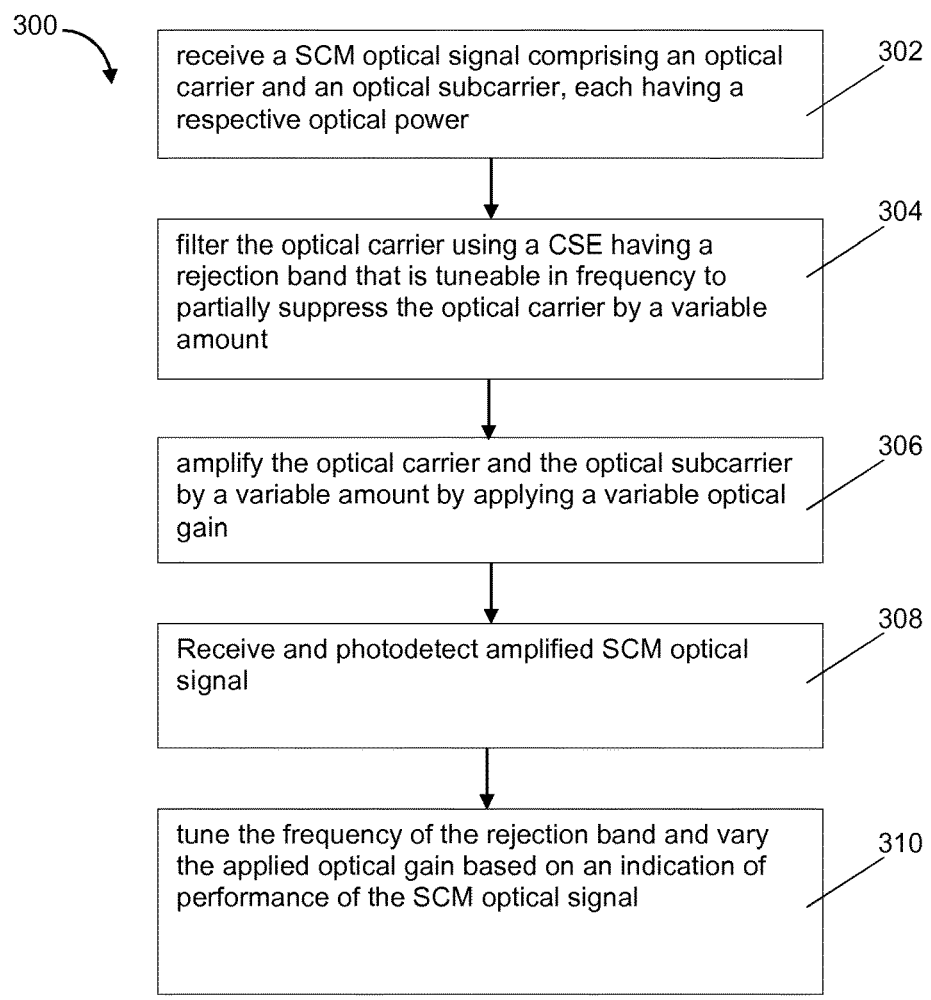
FIG. 7 illustrates the steps of a method according to a ninth embodiment of the invention of receiving an optical communications signal.

FIG. 7 illustrates the steps of a method 300 of receiving an optical communications signal, according to a ninth embodiment of the invention.

The method 300 comprises steps A. to E. as follows:
A. receiving a subcarrier multiplexing, SCM, optical signal comprising an optical carrier and an optical subcarrier, each having a respective optical power 302;
B. filtering the optical carrier using a carrier suppression element having a rejection band that is tunable in frequency to partially suppress the optical carrier by a variable amount 304;
C. amplifying the optical carrier and the optical subcarrier by a variable amount by applying a variable optical gain 306;
D. receiving and photodetecting the amplified SCM optical signal 308; and
E. tuning the frequency of the rejection band and varying the applied optical gain so as to adjust a ratio of the optical power of the optical carrier at the photoreceiver to the optical power of the optical subcarrier at the photoreceiver based on an indication of performance of the SCM optical signal 310.

Figure 8:
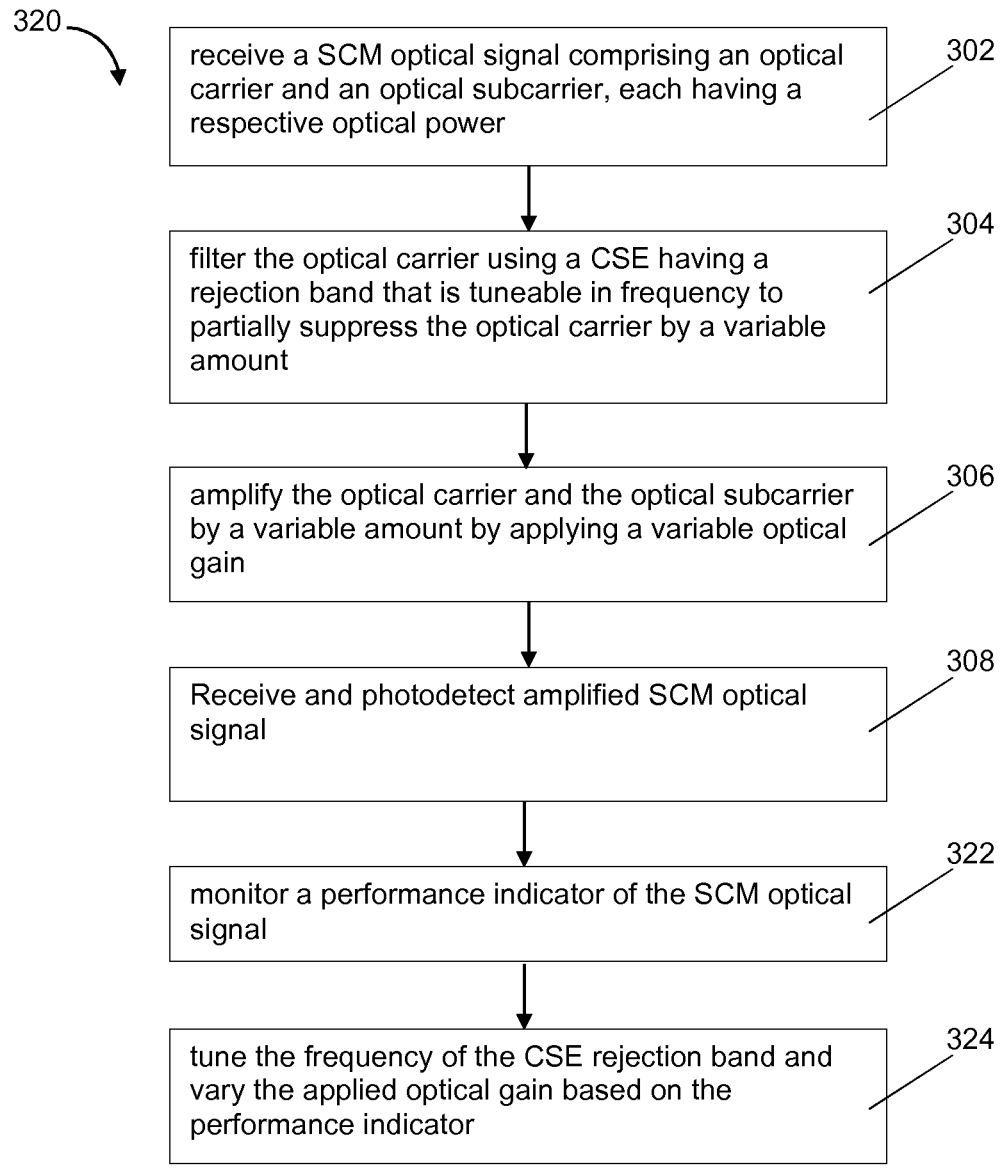
FIG. 8 illustrates the steps of a method according to a tenth embodiment of the invention of receiving an optical communications signal.

FIG. 8 illustrates the steps of a method 320 of receiving an optical communications signal, according to a tenth embodiment of the invention. The method of this embodiment is similar to the method 300 of the previous embodiment, with the following modifications.

The method this embodiment further comprises monitoring a performance indicator of the SCM optical signal 322. The frequency of the rejection band is tuned and the gain of the optical amplifier varied, so as to adjust the ratio of the optical power of the optical carrier at the photoreceiver to the optical power of the optical subcarrier at the photoreceiver, based on the performance indicator 324.

Figure 9A:
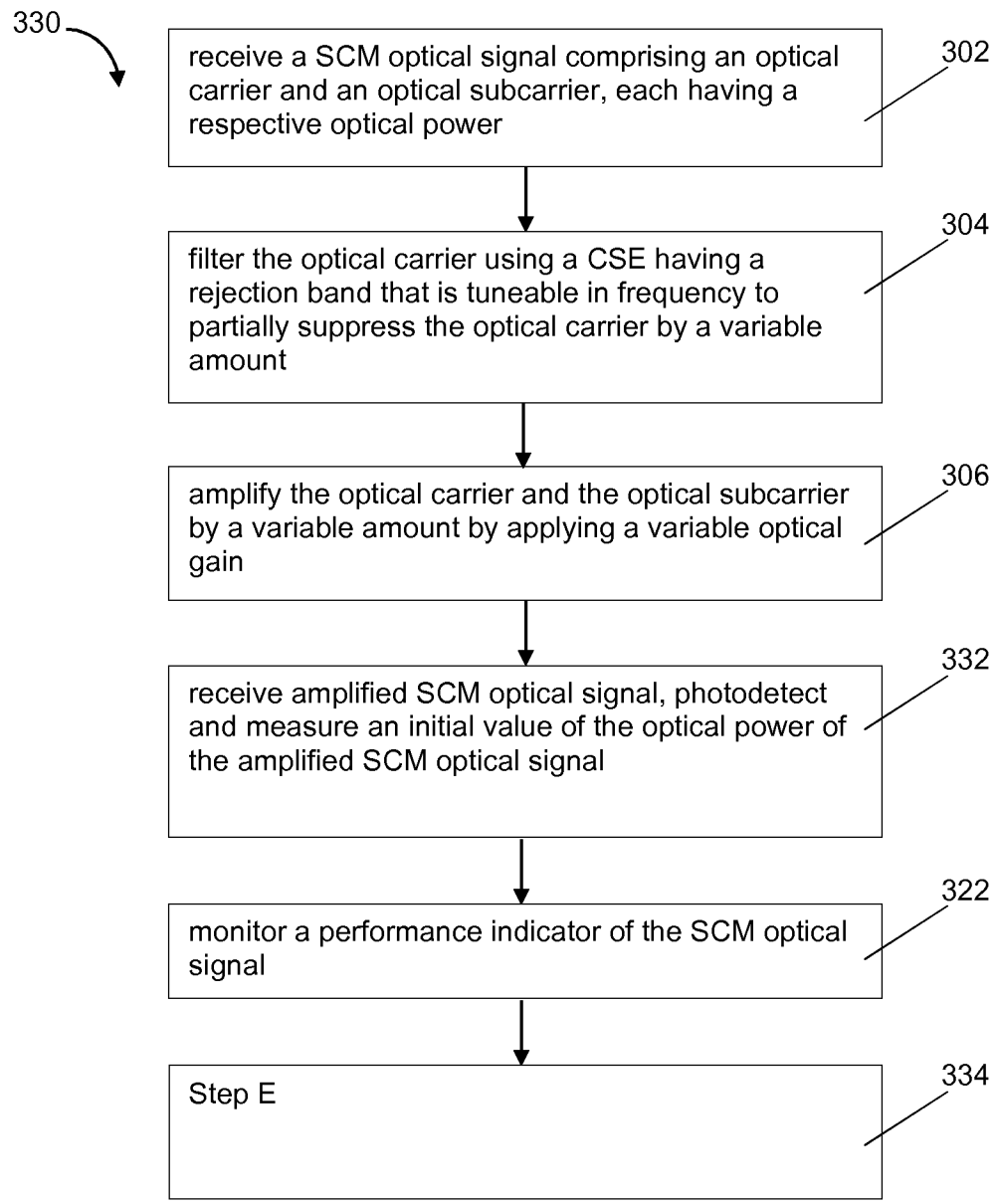
FIG. 9a illustrates part of the steps of a method according to an eleventh embodiment of the invention of receiving an optical communications signal.
Figure 9B:
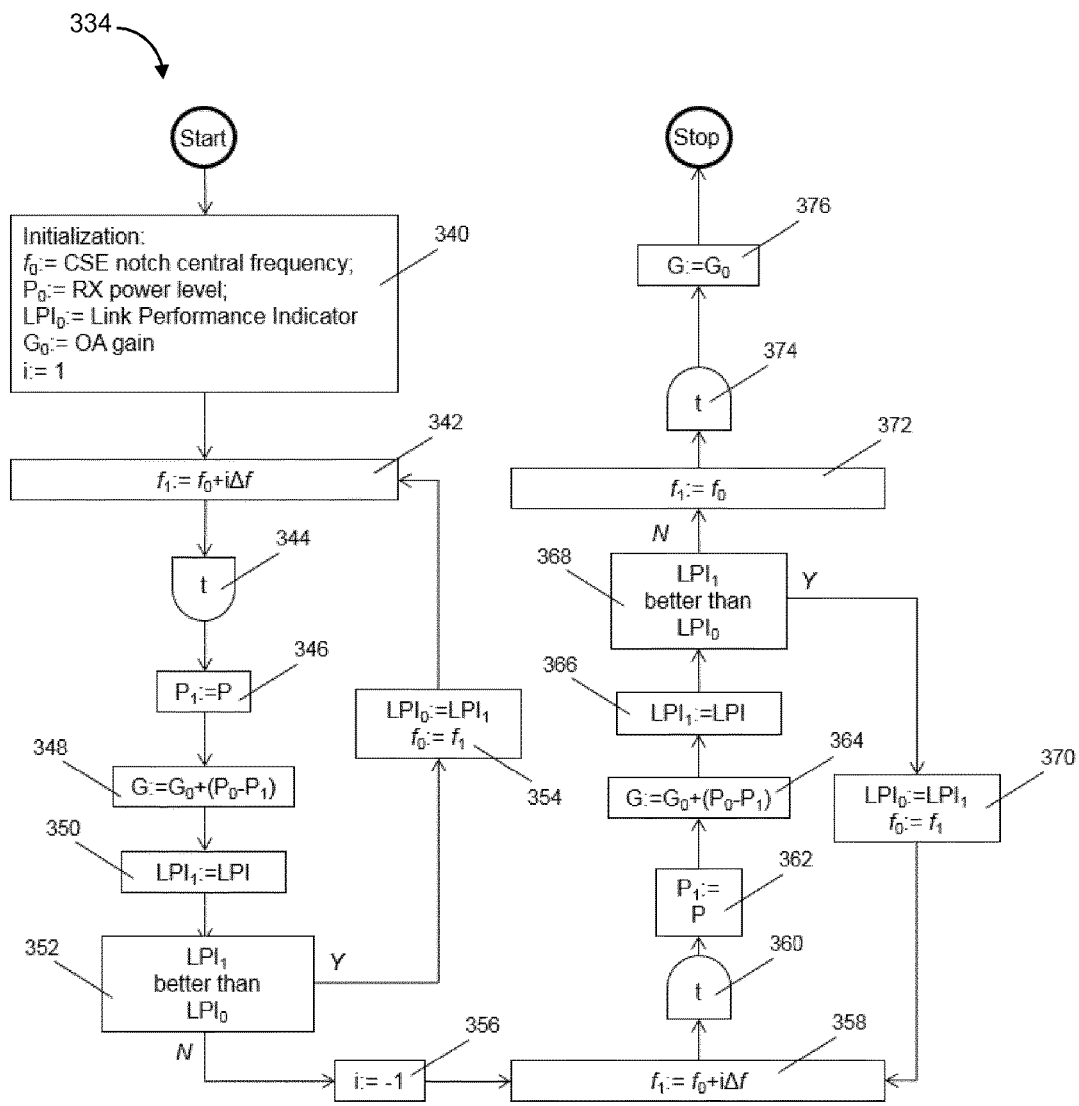
FIG. 9b illustrates the remaining steps of the method according to the eleventh embodiment of the invention of receiving an optical communications signal.

The steps of a method 330 of receiving an optical communications signal, according to an eleventh embodiment of the invention, are shown in FIGS. 9a and 9b. The method of this embodiment is similar to the method 320 of the previous embodiment, with the following modifications.

The SCM optical signal is received from an optical link and the performance indicator is a link performance indicator of the optical link. The link performance indicator may comprise at least one link parameter of the optical link, such as end to end error-vector magnitude, EVM, link gain and spurious free dynamic range, SFDR, of the SCM optical signal, achievable effective power of the optical subcarriers, effective modulation index of the SCM optical signal after carrier suppression, gain of the optical link, and a noise figure of the optical link.

Step D. further comprises measuring an initial value of the optical power of the amplified SCM optical signal 332.

Step E. 334 comprises steps a. to l., as follows. In step a. 340, obtaining a current central frequency, $f_0$, of the rejection band of the CSE, a current value of the performance indicator, $LPI_0$, and a current value of the optical gain, $G_0$. In step b. 340, receiving the initial value of the optical power, $P_0$, of the amplified SCM optical signal. Iteration index, i, is set to 1.

In step c. 342, frequency tuning the rejection band, by increasing the current central frequency by a frequency increment, $\Delta f$; $f_1:=f_0+i\Delta f$. After t seconds 344, step d. is performed, measuring the optical power, P, of the amplified optical signal and setting the current value, $P_1$, of the optical power to said measured value 346.

Step e. is performed, changing the gain of the optical amplifier by an amount to restore the optical power of the amplified SCM optical signal to the initial value 348. This is performed by setting the current gain, G, as $G:=G_0+(P_0-P_1)$.

Step f. is performed, measuring the link performance indicator, LPI, and setting the current value, $LPI_1$, of the link performance indicator to said measured value 350. The current value, $LPI_1$, of the link performance indicator is then compared 352 to the previous value of the performance indicator, $LPI_0$. If the current value is greater than the previous value, the method proceeds by returning to step c., and resets $LPI_0$ to the current value, $LPI_1$ 354. If the current value is less than or equal to the previous value, the method continues to step g. and performs frequency tuning of the CSE rejection band by decreasing the current central frequency by twice the frequency increment, $2\Delta f$ this is achieved 356, 358 by setting the iteration index to −1 and recalculating $f_1:=f_0+i\Delta f$. After t seconds 360, step h. is performed measuring the optical power, P, of the amplified optical signal and setting 362 the current value, $P_1$, of the optical power to said measured value. In step i., the gain of the optical amplifier is changed by an amount to restore the optical power of the amplified SCM optical signal to the initial value 364. This is performed by setting the current gain, G, as $G:=G_0+(P_0-P_1)$.

Then step i. is performed, measuring the link performance indicator, LPI, and setting the current value, $LPI_1$, of the link performance indicator to said measured value 366, and comparing the current value, $LPI_1$, of the link performance indicator to the previous value, $LPI_0$, of the link performance indicator 368. If the current value is greater than the previous value, the method continues to step k. If the current value is less than or equal to the previous value, the method proceeds to step l.

In step k. frequency tuning of the rejection band is performed, by decreasing the current central frequency by the frequency increment, $\Delta f$, and returning to step h. 358; $LPI_0$ is set to the current value, $LPI_1$, and the initial value of the CSE central frequency, $f_0$, is set to the current value, $f_1$, 370, and the calculation $f_1:=f_0+i\Delta f$ is redone using the latest set value of $f_0$.

In step l., the method performs frequency tuning of the rejection band by resetting 372 the current value of the central frequency, $f_1$, to the previous value, $f_0$, waiting for t seconds 374 and then setting 376 the current gain, G, of the optical amplifier as $G:=G_0+(P_0-P_1)$.

In more simple terms, an increment of $\Delta f$ [Hz] is applied to the central frequency of the rejection band of the CSE and after "t" seconds the gain of the optical amplifier is changed in order to restore the optical power of the amplified SCM optical signal to its initial optical power level, $P_0$. A new LPI value is then measured. If the LPI is enhanced, a further increment of $\Delta f$ [Hz] is applied to the CSE central frequency, iterating the method. If the LPI has degraded as a result of applying the frequency increment, a decrease of $2\Delta f$ [Hz] is applied to the CSE central frequency. After "t" seconds the gain of the optical amplifier is changed in order to restore the optical power of the amplified SCM optical signal to its initial optical power level, $P_0$, and the new LPI value is measured. If the LPI is enhanced, a further decrement of $\Delta f$ [Hz] is applied to the CSE central frequency, iterating the method. Otherwise a final increment of $\Delta f$ [Hz] is applied, to restore the optical power of the amplified SCM optical signal to its initial optical power level, $P_0$, and the gain of the optical amplifier adjusted.

A twelfth embodiment of the invention provides a method of receiving an optical communications signal which is similar to the method 300 shown in FIG. 7, with the following modifications.

In this embodiment, there is a preselected frequency separation between the optical carrier and the optical subcarrier. The rejection band of the CSE has a bandwidth that is less than this preselected frequency separation.

A thirteenth embodiment of the invention provides a method of receiving an optical communications signal which is similar to any of the previously described methods 300, 320, 330, shown in FIGS. 7 to 9b, with the following modifications.

In this embodiment, the CSE 52 a tunable notch filter, implemented as a microring resonator. The CSE may alternatively be implemented as a waveguide grating filter, which may be an optical fibre grating filter such as a fibre Bragg grating.

Figure 10:
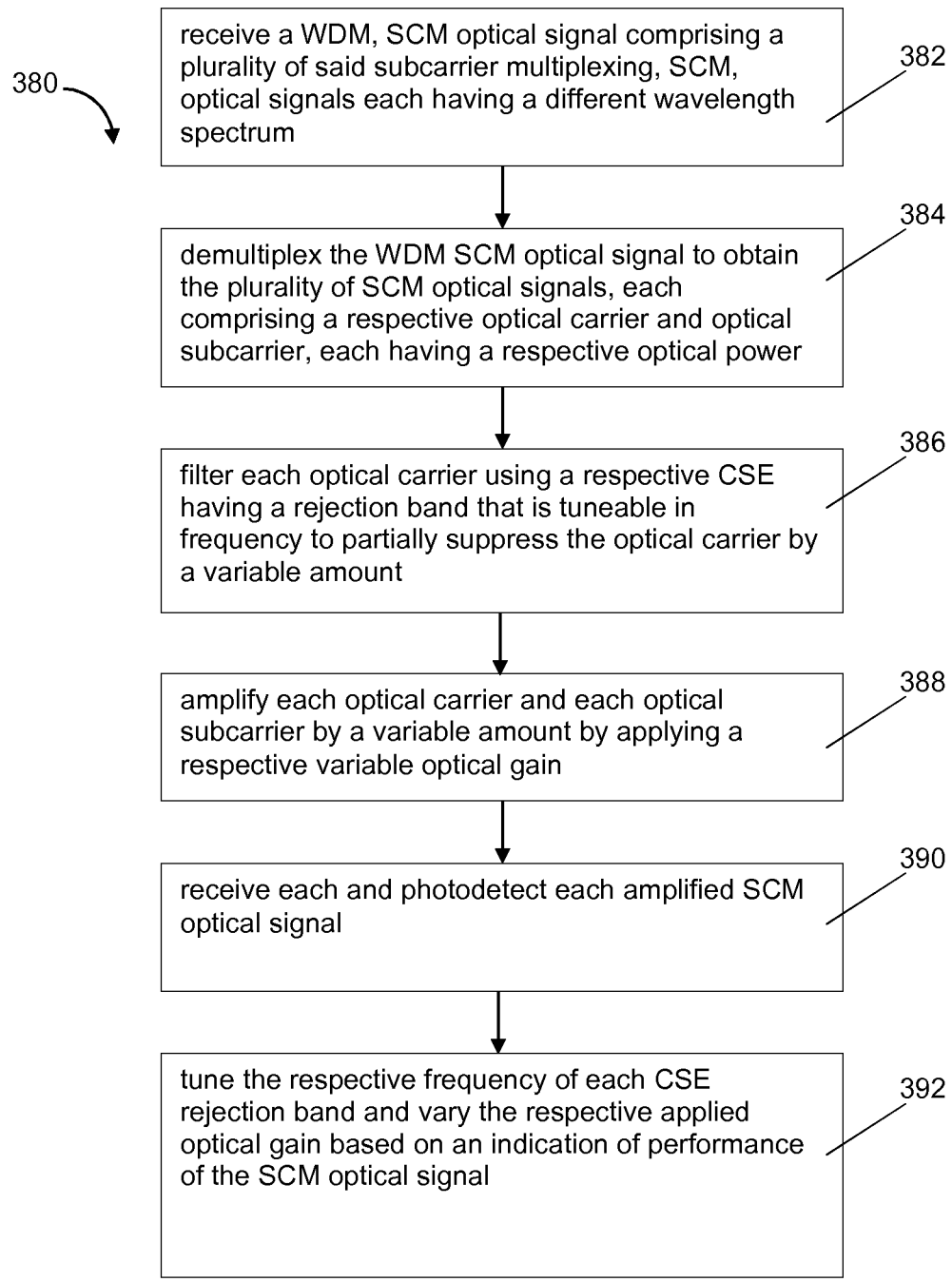
FIG. 10 illustrates the steps of a method according to a fourteenth embodiment of the invention of receiving an optical communications signal.

Referring to FIG. 10, a fourteenth embodiment of the invention provides a method 380 of receiving an optical communications signal, which is similar to the method 300 shown in FIG. 7, with the following modifications.

In this embodiment, step A. comprises receiving a wavelength division multiplexed, WDM, SCM optical signal comprising a plurality of subcarrier multiplexing, SCM, optical signals 382. Each SCM optical signal has a different wavelength spectrum. Step A. additionally comprises demultiplexing the WDM SCM optical signal to obtain the plurality of SCM optical signals 384. The method comprises performing steps B. to E. 386, 388, 390, 392 on each of the SCM optical signals.

A fifteenth embodiment of the invention provides a computer program, comprising instructions which, when executed on at least one processor, cause the at least one processor to carry out any of the steps of any of the above described methods 300, 320, 330, 380 of receiving an optical communications signal.

A sixteenth embodiment of the invention provides a carrier containing the computer program of the previous embodiment. The carrier is one of an electronic signal, optical signal, radio signal, or computer readable storage medium.

The invention claimed is:

1. An optical receiver comprising:
an input arranged to receive a subcarrier multiplexing (SCM) optical signal comprising an optical carrier and an optical subcarrier, each having a respective optical power;
a carrier suppression element arranged to receive the SCM optical signal and having a rejection band that is tunable in frequency to partially suppress the optical carrier by a variable amount;
an optical amplifier having a variable gain, the optical amplifier being arranged to receive the SCM optical signal output from the carrier suppression element and being arranged to amplify the optical carrier and the optical subcarrier;
a photoreceiver arranged to receive the SCM optical signal output from the optical amplifier; and
a controller arranged to cause frequency tuning of the rejection band and variation of the gain of the optical amplifier so as to adjust a ratio of the optical power of the optical carrier at the photoreceiver to the optical power of the optical subcarrier at the photoreceiver based on an indication of performance of the SCM optical signal.

2. The optical receiver of claim 1, wherein the controller is arranged to monitor a performance indicator of the SCM optical signal and the controller is arranged to cause frequency tuning of the rejection band and variation of the gain of the optical amplifier so as to adjust the ratio of the optical power of the optical carrier at the photoreceiver to the optical power of the optical subcarrier at the photoreceiver based on the performance indicator.

3. The optical receiver of claim 2, wherein the input is arranged to receive the SCM optical signal from an optical link and the performance indicator is a link performance indicator of the optical link.

4. The optical receiver of claim 2, wherein the controller is arranged to:
a. obtain a current central frequency of the rejection band of the carrier suppression element, a current value of the performance indicator and a current gain of the optical amplifier;
b. receive an initial value of the optical power of the SCM optical signal received at the photoreceiver;
c. cause frequency tuning of the rejection band, increasing the current central frequency by a frequency increment, $\Delta f$;
d. receive a current value of the optical power of the SCM optical signal received at the photoreceiver;
e. cause the gain of the optical amplifier to change by an amount to restore the optical power of the SCM optical signal received at the photoreceiver to said initial value of the optical power;
f. obtain a current value of the performance indicator and compare the current value to the previous value of the performance indicator, and:
  i. if the current value is greater than the previous value, return to step c.;
  ii. if the current value is less than or equal to the previous value, continue to step g.;
g. cause frequency tuning of the rejection band, decreasing the current central frequency by twice the frequency increment, $2\Delta f$;
h. receive a current value of the optical power of the SCM optical signal received at the photoreceiver;
i. cause the gain of the optical amplifier to change by an amount to restore the optical power of the SCM optical signal received at the photoreceiver to said initial value of the optical power;
j. obtain a current value of the performance indicator and compare the current value to the previous value of the performance indicator, and:
  i. if the current value is greater than the previous value, continue to step k.;
  ii. if the current value is less than or equal to the previous value, continue to step l.;
k. cause frequency tuning of the rejection band, decreasing the current central frequency by the frequency increment, $\Delta f$, and return to step h.;
l. cause frequency tuning of the rejection band, increasing the current central frequency by the frequency increment, $\Delta f$, and repeat steps d. and e.

5. The optical receiver of claim 1, wherein the carrier suppression element comprises one of a microring resonator and an optical waveguide grating filter.

6. The optical receiver of claim 1, wherein there is a preselected frequency separation between the optical carrier and the optical subcarrier and the rejection band of the carrier suppression element has a bandwidth that is less than said preselected frequency separation.

7. The optical receiver of claim 1, wherein:
the optical receiver further comprises a demultiplexer having an input and a plurality of outputs, the input being arranged to receive a wavelength division multiplexed (WDM) SCM optical signal comprising a plurality of said subcarrier multiplexing (SCM) optical signals each having a different wavelength spectrum, and each output being coupled to a respective line comprising a said carrier suppression element, a said optical amplifier and a said photoreceiver; and the controller is arranged to, for each line, cause frequency tuning of the respective rejection band and variation of the gain of the respective optical amplifier so as to adjust the ratio of the optical power of the respective optical carrier at the respective photoreceiver to the optical power of the respective optical subcarrier at the respective photoreceiver based on the indication of performance of the SCM optical signal.

8. An optical transceiver comprising the optical receiver of claim 1.

9. A communications network node comprising the optical receiver of claim 1.

10. A method of receiving an optical communications signal, the method comprising the steps of:
   A. receiving a subcarrier multiplexing (SCM) optical signal comprising an optical carrier and an optical subcarrier, each having a respective optical power;
   B. filtering the optical carrier using a carrier suppression element having a rejection band that is tunable in frequency to partially suppress the optical carrier by a variable amount;
   C. amplifying the optical carrier and the optical subcarrier by a variable amount by applying a variable optical gain;
   D. receiving and photodetecting the amplified SCM optical signal; and
   E. tuning the frequency of the rejection band and varying the applied optical gain so as to adjust a ratio of the optical power of the optical carrier at the photoreceiver to the optical power of the optical subcarrier at the photoreceiver based on an indication of performance of the SCM optical signal.

11. The method of claim 10, further comprising monitoring a performance indicator of the SCM optical signal and frequency tuning the rejection band and varying the gain of the optical amplifier so as to adjust the ratio of the optical power of the optical carrier at the photoreceiver to the optical power of the optical subcarrier at the photoreceiver based on the performance indicator.

12. The method of claim 11, wherein the SCM optical signal is received from an optical link and the performance indicator is a link performance indicator of the optical link.

13. The method of claim 11, wherein step D. further comprises measuring an initial value of the optical power of the amplified SCM optical signal and wherein step E. comprises the steps of:
   a. obtaining a current central frequency of the rejection band of the carrier suppression element, a current value of the performance indicator and a current value of the optical gain;
   b. receiving the initial value of the optical power of the amplified SCM optical signal;
   c. frequency tuning the rejection band, increasing the current central frequency by a frequency increment, Δf;
   d. receiving a current value of the optical power of the amplified SCM optical signal;
   e. changing the gain of the optical amplifier by an amount to restore the optical power of the amplified SCM optical signal to the initial value;
   f. obtaining a current value of the performance indicator and comparing the current value to the previous value of the performance indicator, and:
      i. if the current value is greater than the previous value, returning to step c.;
      ii. if the current value is less than or equal to the previous value, continuing to step g.;
   g. frequency tuning the rejection band, decreasing the current central frequency by twice the frequency increment, 2Δf;
   h. receiving a current value of the optical power of the amplified SCM optical signal;
   i. changing the gain of the optical amplifier by an amount to restore the optical power of the amplified SCM optical signal to the initial value;
   j. obtaining a current value of the performance indicator and comparing the current value to the previous value of the performance indicator, and:
      i. if the current value is greater than the previous value, continuing to step k.;
      ii. if the current value is less than or equal to the previous value, continuing to step l.;
   k. frequency tuning the rejection band, decreasing the current central frequency by the frequency increment, Δf, and returning to step h; and
   l. frequency tuning the rejection band, increasing the current central frequency by the frequency increment, Δf, and repeating step e.

14. The method of claim 10, wherein the carrier suppression element comprises one of a microring resonator and an optical waveguide grating filter.

15. The method of claim 10, wherein there is a preselected frequency separation between the optical carrier and the optical subcarrier and the rejection band of the carrier suppression element has a bandwidth that is less than said preselected frequency separation.

16. The method of claim 10, wherein step A. comprises receiving a wavelength division multiplexed (WDM) SCM optical signal comprising a plurality of said subcarrier multiplexing (SCM) optical signals each having a different wavelength spectrum, and demultiplexing the WDM SCM optical signal to obtain the plurality of SCM optical signals, and wherein the method comprises performing steps B. to E. on each of the SCM optical signals.

17. A non-transitory computer-readable medium comprising, stored thereupon, a computer program comprising instructions configured so as to cause a processor executing the instructions to:
   A. receive a subcarrier multiplexing (SCM) optical signal comprising an optical carrier and an optical subcarrier, each having a respective optical power;
   B. filter the optical carrier using a carrier suppression element having a rejection band that is tunable in frequency to partially suppress the optical carrier by a variable amount;
   C. amplify the optical carrier and the optical subcarrier by a variable amount by applying a variable optical gain;
   D. receive and photodetect the amplified SCM optical signal; and
   E. tune the frequency of the rejection band and varying the applied optical gain so as to adjust a ratio of the optical power of the optical carrier at the photoreceiver to the optical power of the optical subcarrier at the photoreceiver based on an indication of performance of the SCM optical signal.

* * * * *